United States Patent [19]

Naganuma et al.

[11] Patent Number: 5,461,127
[45] Date of Patent: Oct. 24, 1995

[54] POLYMERIZATION CATALYSTS AND PROCESS FOR PRODUCING POLYMERS

[75] Inventors: Shoji Naganuma; Masami Watanabe, both of Sodegaura, Japan

[73] Assignee: Idemitsu Kosan Co., Ltd., Tokyo, Japan

[21] Appl. No.: 124,650

[22] Filed: Sep. 22, 1993

[30] Foreign Application Priority Data

Sep. 22, 1992 [JP] Japan .................................. 4-278203
Mar. 9, 1993 [JP] Japan .................................. 5-075328

[51] Int. Cl.$^6$ .................................................. C08F 4/643
[52] U.S. Cl. .......................... 526/127; 526/132; 526/133; 526/134; 526/160; 502/103; 502/117; 502/178; 502/132; 502/152
[58] Field of Search .................................. 526/127, 132, 526/133, 145, 146, 147, 154, 160, 171; 502/117, 128, 132

[56] References Cited

U.S. PATENT DOCUMENTS

| | | | |
|---|---|---|---|
| 5,064,802 | 11/1991 | Stevens et al. | 502/155 |
| 5,171,919 | 12/1992 | Watanabe et al. | |
| 5,294,685 | 3/1994 | Watanabe et al. | 526/134 |
| 5,330,948 | 7/1994 | Marks et al. | 502/104 |
| 5,350,723 | 9/1994 | Neithamer et al. | 502/104 |
| 5,369,196 | 11/1994 | Matsumoto et al. | 526/127 |

OTHER PUBLICATIONS

*Angew. Chem. Int. Ed. Engl.* 1992, 31 No. 9 "Non–Coordinating" Anions: Underestimated Ligands, by Munfred Bochmann, pp. 1181 & 1182.
*Organometallics* 1990, 1290–1295, Reactions of Bis(cyclopentadienyl)dimethylzirconium with Fluorocarbon Acids. Structure, Dynamic Properties, and $^{91}$Zr NMR Spectra of $(C_5H_5)_2Zr[HC(SO_2CF_3)_2-O,O'][HC(SO_2CF_3)_2-O]$.
*J. Chem. Soc., Chem. Commun.*, 1990, pp. 1038 & 1039 M. Bochman et al.
*Angew. Chem. Int. Ed. Engl. 30,* (1991 No. 9, pp. 1152–1155 A. Horton et al.
*Organometallics* 1991, 10, 3910–3918, 1991 American Chemical Society, Lewis–Base–Free Cationic Zirconocene Complexes Containing an Alkenyl Ligand, Andrew D. Horton et al.
*Journal of Organometallic Chemistry* 194(1980)297–307 U. Thewalt et al.
*Journal of Organometallic Chemistry,* 302(1986)193–200 U. Thewalt et al.
*Inorg. Chem.* 1987, 26, 383–386 R. Jordan et al.
*J. Am. Chem. Soc.* 1986, 108, 1718–1719 R. F. Jordan et al.
*Journal of Organometallic Chemistry, 150(1978)59–66* U. Thewalt et al.
*Journal of Organometallic Chemistry,* 276(1984)341–347 U. Thewalt et al.
Shelly, K. et al. (1985) J Am Chem Soc 107(21), 5955.
Jordan, R. F. (1988) J Chem Ed 65(4), 285 (Apr.).

*Primary Examiner*—Mark Nagumo
*Attorney, Agent, or Firm*—Oblon, Spivak, McClelland, Maier & Neustadt

[57] ABSTRACT

A polymerization catalyst comprising a polycation complex (A) represented by the following Formula, $[(CUHC)_nMX_m]^{j+} \cdot ([Y]^-)_j$; [(CUHC): a cyclic unsaturated hydrocarbon group], more particularly, a polymerization catalyst comprising the reaction product of a transition metal compound and an ionic compound (b) capable of forming an ionic complex when reacted with a transition metal compound, and the above-mentioned compound (b), is disclosed.

14 Claims, No Drawings

POLYMERIZATION CATALYSTS AND PROCESS FOR PRODUCING POLYMERS

BACKGROUND OF THE INVENTION

1. Field of the Invention

The present invention relates to a novel, useful polymerization catalyst and a process for producing a polymer using the polymerization catalyst. More particularly, the present invention relates to a polymerization catalyst especially useful as an olefin polymerization catalyst, and a process for producing an olefin based polymer, using the polymerization catalyst.

2. Related Art

Heretofore, as highly active homogeneous olefin polymerization catalysts, those catalysts composed of a transition metal compound and aluminoxane are known (Japanese Patent Application Unexamined Publications Nos. Sho 58-19309 and 60-217209).

Further, it has been proposed that as active species of the homogeneous olefin polymerization catalysts, cation species are useful [J. Am. Chem. Soc. 81, 81 (1959), J. Am. Chem. Soc. 82, 1953 (1960), J. Am. Chem. Soc. 107, 7219 (1985)]. The use of the active species in olefin polymerization after isolation, is described in, for example, J. Am. Chem. Soc. 108, 7410 (1986), Japanese Patent Application PCT publication No. Hei 01-502636, Japanese Patent Application Unexamined Publication No. Hei 03-139504, and European Patent Publication No. 468651. The use of the active species with an organoaluminum compound is described in, for example, Japanese Patent Application Unexamined Publication No. Hei 03-207704 and International Patent Publication No. 92-1723. Further, an olefin polymerization catalyst composed of a transition metal compound having a ligand containing a group, —$SO_3R$ and an organoaluminum oxy compound is described in, for example, European Patent Publication No. 519746.

However, the catalyst system composed of a combination of a transition metal compound and aluminoxane have some disadvantages. For example, trimethylaluminum which is a synthesis material for aluminoxane is flammable and explosive, and thus its handling is dangerous. Also, trimethylaluminum is expensive. Further, a large amount, against a transition metal compound, of aluminoxane should be used. Therefore, the catalyst systems are not effective in industrial productivity.

Further, in any examples of polymerization disclosed in the above publications or literature, monocation species are used as an active species. Thus, these catalysts are not always satisfactory in view of the catalytic activities for olefin polymerization and the molecular weight of the resultant polymer.

The present invention was made in view of the above problems, and has its object of providing a highly active polymerization catalyst which can give rise to resultant homo- or co-polymers having high molecular weight and having a narrow comonomer distribution, and make it possible to control the molecular weight distribution within narrow range, and a process for producing a polymer using the polymerization catalyst.

SUMMARY OF THE INVENTION

To achieve the above objects, the present invention provides a polymerization catalyst comprising a polycation complex (A) represented by the following Formula (I):

$$[(CUHC)_n MX_m]^{j+} \cdot ([Y]^-)_j \quad (I)$$

wherein M is a metal of Groups 3 to 10 or the Lanthanide Series of the Periodic Table; CUHC is a cyclic unsaturated hydrocarbon group; CUHC may be the same as or different from each other; two or more of CUHC may form a bridge structure; X is a σ-bond ligand, chelate ligand or Lewis base; X may be the same as or different from each other; CUHC and X may form a bridge; j is an integer of from 2 to 4; n is an integer of from 0 to 2, m is an integer of from 0 to 6; n+m is a number, [(the valency of M) −j]; and at least one of [Y]⁻ is a noncoordinating anion wherein a plurality of groups are attached to an element selected from Groups 13 to 15 of the Periodic Table, and the Lewis base may be coordinated.

Further, the present invention provides a polymerization catalyst, wherein the Polycation Complex (A) is composed of the reaction product of the following Compound (a) and Compound (b), and the Compound (b):

(a) a transition metal compound; and
(b) an ionic compound capable of forming an ionic complex when reacted with the transition metal compound (a).

Further, the present invention provides a process for producing a polymer, which comprises subjecting an olefin to homopolymerization or subjecting an olefin and the other olefins or the other monomers to copolymerization in the presence of the above-mentioned polymerization catalyst.

The polymerization catalysts according to the present invention may not only comprise the polycation complex (A), but also may comprise the polycation complex (A) and the organoaluminum compound (B) and may comprise, as catalyst components, the polycation complex (A), the organoaluminum compound (B) and the Lewis acid (C).

Further, as mentioned above, the polymerization catalyst may be those wherein any one of the Catalyst Components (A), (B) and (C) is supported on the carrier [Catalyst Component (D)]. The use of such supported catalysts will result in improvement of the bulk density and particle size distribution of the resultant polymers.

In addition, the polymerization catalysts according to the present invention are particularly useful in polymerization of olefins. However, the catalysts can be used in polymerization of the other unsaturated compounds including chain diolefins such as butadiene, isoprene and 1,5-hexadiene, cyclic olefins such as norbornene and 1,4,5,8-dimethano-1,2,3,4,4a,5,8,8a-octahydronaphthalene, cyclic diolefins such as norbornadiene and ethylidene norbornene, unsaturated esters such as ethylacrylate and methylmethacrylate, and lactones such as beta-propiolactone, beta-butyrolactone and gamma-butyrolactone.

DETAILED DESCRIPTION OF PREFERRED EMBODIMENTS OF THE INVENTION

The present invention will be described in more detail below.

1. Polycation Complex Catalyst Component (A):

Catalyst Components (A) are represented by the following Formula (I):

$$[(CUHC)_n MX_m]^{j+} \cdot ([Y]^-)_j \quad (I)$$

wherein M is a metal of Groups 3 to 10 or the Lanthanide Series of the Periodic Table; CUHC is a cyclic unsaturated hydrocarbon group; CUHC may be the same as or different from each other; two or more of CUHC may form a bridge structure; X is a σ-bond ligand, chelate ligand or Lewis base;

X may be the same as or different from each other; CUHC and X may form a bridge; j is an integer of from 2 to 4; n is an integer of from 0 to 2, m is an integer of from 0 to 6; n+m is a number, [(the valency of M) −j]; $[Y]^-$ is a noncoordinating anion, $[Y^1]^-$ and $[Y^2]^-$; $[Y^1]^-$ is an anion wherein a plurality of groups are attached to an element, i.e., $[M^1Z^1Z^2\ldots Z^n]^-$ ($M^1$ is an element belonging to Groups 5 to 15, preferably Groups 13 to 15 of the Periodic Table; $Z^1$ to $Z^n$ are a hydrogen atom, a dialkylamino group, $C_{1-20}$ oxygen-containing group, $C_{1-20}$ hydrocarbon group, organometalloid group, halogen atom or halogenated hydrocarbon; two or more groups may form a ring; and n is an integer, [(the valency of center metal, $M^1$)+ 1]) and means that at least one of them is a noncoordinating anion wherein a plurality of groups are attached to an element belonging to Groups 13 to 15 of the Periodic Table; and $[Y^2]^-$ is a conjugated base of a Bronsted acid having a pKa value of below −10, a conjugated base of Bronsted acid and Lewis acid, or a conjugated base of acids as generally defined as super strong acid; and Lewis base may be coordinated.

In the present invention, examples of M are titanium, zirconium, hafnium, vanadium, scandium, yttrium, niobium, chromium, molybdenum, manganese, technetium, iron, ruthenium, cobalt, rhodium, nickel and palladium. Examples of CUHC are a cyclopentadienyl group, methylcyclopentadienyl group, ethylcyclopentadienyl group, isopropylcyclopentadienyl group, 1,2-methylcyclopentadienyl group, 1,3-dimethylcyclopentadienyl group, 1,2,3-trimethylcyclopentadienyl group, 1,2,4-trimethylcyclopentadienyl group, pentamethylcyclopentadienyl group, and trimethylsilylcyclopentadienyl group. Examples of cross-linked CUHC are an ethylenebisindenyl group, ethylenebis(tetrahydroindenyl) group, isopropylidene(cyclopentadienyl-9-fluorenyl) group, cyclohexylidene(cyclopentadienyl-9-fluorenyl) group, dimethylsilylene(tetrahydroindenyl) group, dimethylsilylenebis(indenyl) group, and racemi-dimethylsilylenebis(3-methylcyclopentadienyl) group, racemi-dimethylsilylenebis(1,2,4-trimethylcyclopentadienyl) group. Examples of X are a hydrogen atom, halogen atoms such as fluorine, chlorine, bromine and iodine; $C_{1-20}$ hydrocarbon groups such as a methyl group, ethyl group, n-propyl group, isopropyl group, n-butyl group, isobutyl group, n-octyl group, n-eicosyl group, phenyl group, tolyl group and benzyl group; $C_{1-20}$ oxygen-containing groups such as a methoxy group, ethoxy group, n-propoxy group, isopropoxy group, n-butoxy group, isobutoxy group, n-octyloxy group, phenoxy group, benzyloxy group and acetoxy group; silicon-containing groups such as a trimethylsilyl group and trimethylsilylmethyl group; and chelate ligand such as a acetylacetonate group.

In the anion, $[Y^1]^-$ wherein a plurality of groups are attached to an element, i.e., $[M^1Z^1Z^2\ldots Z^n]^-$, $M^1$ includes B, Al, Si, P, As and Sb, preferably B and Al; and $Z^1$ to $Z^n$ include dialkylamino groups such as a dimethylamino group and diethylamino group, $C_{1-20}$ oxygen-containing groups such as a methoxy group, ethoxy group, n-butoxy group, phenoxy group and 2,6-di-tert.-butyl-4-methylphenoxy group, $C_{1-20}$ hydrocarbon groups such as a methyl group, ethyl group, n-propyl group, isopropyl group, n-butyl group, isobutyl group, n-octyl group, n-eicosyl group, phenyl group, p-tolyl group, benzyl group, 4-t-butylphenyl group and 3,5-dimethylphenyl group, halogen atoms such as fluorine, chlorine, bromine and iodine, C1-20 halogenated hydrocarbon groups such as a p-fluorophenyl group, 3,5-difluorophenyl group, pentachlorophenyl group, 3,4,5-trifluorophenyl group, pentafluorophenyl group and 3,5-di(trifluoromethyl)phenyl group, and organometalloid groups such as a pentamethylantimony group, trimethylsilyl group, trimethylgermyl group, diphenylarsine group, dicyclohexylantimony group and diphenylboron group.

Examples of noncoordinating anion, $[Y^2]^-$, i.e., a conjugated base of a Bronsted acid having a pKa value of below −10, a conjugated base of a Bronsted acid and Lewis acid, or a conjugated base of acids as generally defined as super strong acid, are trifluoromethanesulfonic acid anion $(CF_3SO_3)^-$ (hereinafter may be referred to as $[OTf]^-$), bis(trifluoromethanesulfonyl)methyl anion, bis(trifluoromethanesulfonyl)benzyl anion, bis(trifluoromethanesulfonyl)amide, perchloric acid anion $(ClO_4)^-$, trifluoroacetic acid anion $(CF_3CO_2)^-$, hexafluoroantimony anion $(SbF_6)^-$, fluorosulfonic acid anion $(FSO_3)^-$, chlorosulfonic acid anion $(ClSO_3)^-$, fluorosulfonic acid anion/5-fluorinated antimony $(FSO_3\text{-}SbF_5)^-$, fluorosulfonic acid anion/5-fluorinated arsenic $(FSO_3\text{-}AsF_5)^-$, and trifluoromethanesulfonic acid anion/5-fluorinated antimony $(CF_3\text{-}SO_3/SbF_5)^-$. Of these, trifluoromethanesulfonic acid anion (triflate) $[OTf]^-$ is preferred.

Preferably, Catalyst Component (A) may comprise the reaction product of Transition Metal Compound (a) and Ionic Compound (b) capable of forming an ionic complex when reacted with Transition Metal Compound (a), and the above-mentioned Compound (b). In the present invention, Transition Metal Compounds (a) include, for example, those compounds represented by the following Formula (II):

$$(CUHC)_n MX_{m+j} \qquad (II)$$

wherein M, CUHC, X, n, m and j are as defined in the above-mentioned Formula (I).

Examples of Transition Metal Compounds (a) include those having zirconium as indicated below, and those compounds having titanium or hafnium instead of zirconium. Examples include the following compounds:
(Pentamethylcyclopentadienyl)zirconium trimethyl,
(Pentamethylcyclopentadienyl)zirconium triphenyl,
(Pentamethylcyclopentadienyl)zirconium tribenzyl,
(Pentamethylcyclopentadienyl)zirconium trichloride,
(Pentamethylcyclopentadienyl)zirconium trimethoxide,
(Cyclopentadienyl)zirconium trimethyl,
(Cyclopentadienyl)zirconium triphenyl,
(Cyclopentadienyl)zirconium tribenzyl,
(Cyclopentadienyl)zirconium trichloride,
(Cyclopentadienyl)zirconium trimethoxide,
(Cyclopentadienyl)zirconium dimethylmethoxide,
(Methylcyclopentadienyl)zirconium trimethyl,
(Methylcyclopentadienyl)zirconium tripehnyl,
(Methylcyclopentadienyl)zirconium tribenzyl,
(Methylcyclopentadienyl)zirconium trichloride,
(Methylcyclopentadienyl)zirconium trimethoxide,
(Methylcyclopentadienyl)zirconium dimethylmethoxide,
(Dimethylcyclopentadienyl)zirconium trichloride,
(Trimethylcyclopentadienyl)zirconium trichloride,
(Trimethylsilylcyclopentadienyl)zirconium trichloride,
(Tetramethylcyclopentadienyl)zirconium trichloride,
Indenylzirconium trichloride,
Fluorenylzirconium trichloride
Bis(cyclopentadienyl)zirconium dimethyl,
Bis(cyclopentadienyl)zirconium diphenyl,
Bis(cyclopentadienyl)zirconium dibenzyl,
Bis(cyclopentadienyl)zirconium dichloride,
Bis(cyclopentadienyl)zirconium dimethoxide,
Bis(cyclopentadienyl)zirconium diethyl,
Bis(cyclopentadienyl)zirconium methoxychloride,
Bis(cyclopentadienyl)zirconium dihydride, Bis(cyclopentadienyl)zirconium dichlorohydride,
Bis(methylcyclopentadienyl)zirconium dimethyl,
Bis(methylcyclopentadienyl)zirconium diphenyl,
Bis(methycyclopentadienyl)zirconium dibenzyl,
Bis(methylcyclopentadienyl)zirconium dichloride,
Bis(pentamethylcyclopentadienyl)zirconium dimethyl,
Bis(pentamethylcyclopentadienyl)zirconium dichloride,
Bis(pentamethylcyclopentadienyl)zirconium dibenzyl,
Bis(pentamethylcyclopentadienyl)zirconium methylchloride,
Bis(pentamethylcyclopentadienyl)zirconium methylhydride,
Ethylenebis(indenyl)zirconium dimethyl,
Ethylenebis(indenyl)zirconium dichloride,
Ethylenebis(tetrahydroindenyl)zirconium dimethyl,
Ethylenebis(tetrahydroindenyl)zirconium dichloride,
Dimethylsilylenebis(cyclopentadienyl)zirconium dimethyl,
Dimethylsilylenebis(cyclopentadienyl)zirconium dichloride,
Isopropylidene(cyclopentadienyl)(9-fluorenyl)zirconium dimethyl,
Phenylmethylmethylene(cyclopentadienyl)(9-fluorenyl)zirconium dimethyl,
Diphenylmethylene(cyclopentadienyl)(9-fluorenyl)zirconium dimethyl,
Ethylene(cyclopentadienyl)(9-fluorenyl)zirconium dimethyl,
Cyclohexylidene(cyclopentadienyl)(9-fluorenyl)zirconium dimethyl,
Cyclopentylidene(cyclopentadienyl)(9-fluorenyl)zirconium dimethyl,
Cyclobutylidene(cyclopentadienyl)(9-fluorenyl)zirconium dimethyl,
Dimethylsilylene(cyclopentadienyl)(9-fluorenyl)zirconium dimethyl,
Dimethylsilylenebis(2,3,5-trimethylcyclopentadienyl)zirconium dichloride,
Dimethylsilylenebis(2,3,5-trimethylcyclopentadienyl)zirconium dimethyl,
Dimethylsilylenebis(indenyl)zirconium dichloride,
Zirconium tetramethyl,
Zirconium tetrabenzyl,
Zirconium tetramethoxide,
Zirconium tetraethoxide,
Zirconium tetrabutoxide,
Zirconium tetrachloride,
Zirconium tetrabromide,
Zirconium butoxytrichloride,
Zirconium dibutoxydichloride,
Bis(2,5-di-t-butylphenoxy)zirconium dimethyl,
Bis(2,5-di-t-butylphenoxy)zirconium dichloride and
Zirconium bis(acetylacetonate)dichloride.

In addition, Compounds (a) may include the compounds represented by the following Formula (II'):

(II')

wherein CUHC, M and X are as defined in the above-mentioned Formula (I); Z is $SiR^1_2$, $CR^1_2$, $SiR^1_2SiR^1_2$, $CR^1_2CR^1_2$, $CR^1_2CR^1_2CR^1_2$, $CR^1=CR^1$, $CR^1_2SiR^1_2$ or $GeR^1_2$; Y is $-N(R^2)-$, $-O-$, $-S-$ or $-P(R^2)-$ ($R^1$ is a hydrogen atom, group having up to 20 non-hydrogen atoms, alkyl group, aryl group, silyl group, halogenated alkyl group, halogenated aryl group or a combination thereof; and $R^2$ is an alkyl group having 1 to 10 carbon atoms or aryl group having 6 to 10 carbon atoms; $R^2$ may form, with one or more of $R^1$, a condensed ring system); and n' is an integer of 1 or 2.

Examples of these compounds include
dimethylsilylene(t-butylamido)(tetramethyl-cyclopentadienyl)zirconiumdichloride and
dimethylsilylene(methylamido)(tetramethyl-cyclopentadienyl)zirconium dichloride.

In addition, examples of Transition Metal Compound (a) include those compounds having a metal belonging to the III to X Groups of the Periodic Table, such as vanadium, or a metal belonging to the Lanthanoids Series.

The compounds (b) capable of forming an ionic complex when reacted with Transition Metal Compound (a), are not particularly limited to, but include those compounds represented by the following Formula (III) or (IV):

wherein $L^2$ is $M^2$, $R^2R^3M^3$, $R^4_3C$ or $R^5M^3$.

In Formula (III) or (IV), $[Y]^-$ is as already defined in the above-mentioned Formula (I); $L^1$ is a Lewis base; $R^1$ is a hydrogen atom or a $C_{1-20}$ hydrocarbon group; $R^2$ and $R^3$ are independently a cyclopentadienyl group (Cp) or substituted cyclopentadienyl group (Cp may be the same as or different from each other, and two or more of Cp may form a bridge structure); $R^4$ is a $C_{1-20}$ hydrocarbon group or a $C_{1-20}$ oxygen-containing group; k is an ion value number of $[L^1-R^1]$ and $[L^2]$, and is an integer of 1 to 3; p is an integer of at least 1; and q is specified by the formula: $q=(p \times k)$; $M^3$ has an element of the 7 to 12 Groups of the Periodic Table; and $R^5$ is porphyrins, phthalocyanines or aryl group derivatives.

Examples of the Lewis bases ($L^1$) are amines such as ammonium, methylamine, aniline, dimethylamine, diethylamine, N-methylaniline, diphenylamine, N,N-dimethylaniline, trimethylamine, triethylamine, tri-n-butylamine, methyldiphenylamine, pyridine, p-bromo-N,N-dimethylaniline, p-nitro-N,N-dimethylaniline and bis(trisphenylphosphorus)-µ-nitride; phosphines such as triethylphosphine, triphenylphosphine and diphenylphosphine; ethers such as dimethyl ether, diethyl ether, dioxane and tetrahydrofuran; thioethers such as tetrahydrothiophene; esters such as ethylbenzoate; nitriles such as acetonitrile and benzonitrile; chain unsaturated hydrocarbons such as ehtylene, butadiene, 1-pentene, isoprene and their derivatives; and cyclic unsaturated hydrocarbons such as benzene, toluene, xylene, cyclooctadiene and cyclooctatetraene.

Examples of $R^1$ are a hydrogen atom, methyl group, ethyl group, benzyl group and trityl group.

Examples of $R^2$ and $R^3$ are a cyclopentadienyl group, methylcyclopentadienyl group, ethylcyclopentadienyl group and pentamethylcyclopentadienyl group.

Examples of $R^4$ are a phenyl group, p-tolyl group and p-methoxypenyl group.

Examples of $R^5$ are tetraphenylporphyrin, phthalocyanines, aryl and methacryl.

Examples of $M^2$ are Li, Na, K, Ag, Cu, Br, I and $I_3$.

Examples of $M^3$ are Mn, Fe, Co, Ni and Zn.

Examples of Ionic Compound (b) capable of forming an ionic complex when reacted with Transition Metal Compound (a) include the following compounds:
Triethylammonium tetraphenylborate,
Tri(n-butyl)ammonium tetraphenylborate,
Trimethylammonium tetraphenylborate,
Tetraethylammonium tetraphenylborate, Methyltri(n-butyl)ammonium tetraphenylborate,
Benzyltri(n-butyl)ammonium tetraphenylborate,
Dimethyldiphenylammonium tetraphenylborate,
Triphenyl(methyl)ammonium tetraphenylborate,
Trimethylanilinium tetraphenylborate,
Methylpyridinium tetraphenylborate,
Benzylpyridinium tetraphenylborate,
Methyl(2-cyanopyridinium) tetraphenylborate,
Triethylammonium tetrakis(pentafluorophenyl)borate,
Tri(n-butyl)ammonium tetrakis(pentafluorophenyl)borate,
Triphenylammonium tetrakis(pentafluorophenyl)borate,
Tetra-n-butylammonium tetrakis(pentafluorophenyl)borate,
Tetraethylammonium tetrakis(pentafluorophenyl)borate,
Benzyl(tri-n-butyl)ammonium tetrakis(pentafluorophenyl)borate,
Methylediphenylammonium tetrakis(pentafluorophenyl)borate,
Triphenyl(methyl)ammonium tetrakis(pentafluorophenyl)borate,
Methylanilinium tetrakis(pentafluorophenyl)borate,
Dimethylanilinium tetrakis(pentafluorophenyl)borate,
Trimethylanilinium tetrakis(pentafluorophenyl)borate,
Methylpyridinium tetrakis(pentafluorophenyl)borate,
Benzylpyridinium tetrakis(pentafluorophenyl)borate,
Methyl(2-cyanopyridinium) tetrakis(pentafluorophenyl)borate,
Benzyl(2-cyanopyridinium) tetrakis(pentafluorophenyl)borate,
Methyl(4-cyanopyridinium) tetrakis(pentafluorophenyl)borate,
Triphenylphosphonium tetrakis(pentafluorophenyl)borate,
Dimethylanilinium tetrakis[bis(3,5-ditrifluoromethyl)phenyl]borate,
Ferrocenium tetraphenylborate,
Silver tetraphenylborate,
Trityl tetraphenylborate,
Tetraphenylporphyrin manganese tetraphenylborate,
Ferrocenium tetrakis(pentafluorophenyl)borate,
1,1'-Dimethylferrocenium tetrakis(pentafluorophenyl)borate,
Decamethylferrocenium tetrakis(pentafluorophenyl)borate,
Silver tetrakis(pentafluorophenyl)borate,
Trityl tetrakis(pentafluorophenyl)borate,
Lithium tetrakis(pentafluorophenyl)borate,
Sodium tetrakis(pentafluorophenyl)borate,
Tetraphenylporphyrin manganese tetra(pentafluorophenyl)borate,
Tetrafluoroboric acid,
Tetrafluorosilver borate,
Hexafluorophosphoric acid,
Hexafluorophophoric acid silver,
Hexafluoroarsenic acid,
Hexafluoroarsenical silver,
Perchloric acid,
Silver perchlorate,
Trifluoroacetic acid,
Silver trifluoroacetate,
Trifluoromethanesulfonic acid,
Silver trifluoromethanesulphonate,
Silver-bis(trifluoromethylsulfonyl)methyl,
Silver-bis(trifluoromethylsulfonyl)benzyl,
Silver-bis(trifluoromethylsulfonyl)amide,
Bis(trifluoromethylsulfonyl)methane,
Bis(trifluoromethylsulfonyl)phenylmethane, and
Bis(trifluoromethylsulfonyl)amine.

In addition, Polycation Complex (A) represented by the general Formula (I) are synthesized as follows. For example, in the case of dication, a dication complex corresponding to Formula (I) may be obtained by using, as Component (b), 2 equivalents of $([L^1-R^1]^{k+})_p([Y^2]^-)_q$ (Formula (III)) or $([L^2]^{k+})_p([Y^2]^-)_q$ (Formula (IV)) together with Transition Metal Compound (a).

The resultant dication complex, $[CUHC)_nMX_m]^{2+}\cdot([Y^2]^-)_2$ may be reacted with 1 equivalent of $([L^1-R^1]^{k+})_p([Y^1]^-)_q$ (Formula (III)) or $([L^2]^{k+})_p([Y^1]^-)_q$ (Formula (IV)), to obtain a dication complex, $[CUHC)_nMX_m]^{2+}\cdot([Y^2]^-)([Y^1]^-)$, or if reacted with 2 equivalents of the same, to obtain a dication complex, $[CUHC)_nMX_m]^{2+}\cdot([Y^1]^-)_2$.

Further, Transition Metal Compound (a) may be reacted with, as Compound (b), 1 equivalent of $([L^1-R^1]^{k+})_p([Y^2]^-)_q$ (Formula (III)) or $([L^2]^{k+})_p([Y^2]^-)_q$ (Formula (IV)), to synthesize $[(CUHC)_nMX_{m+1}]^+\cdot([Y^2]^-)$, and then reacted with 1 equivalent of $([L^1-R^1]^{k+})_p([Y^1]^-)_q$ (Formula (III)) or $([L^2]^{k+})_p([Y^1]^-)_q$ (Formula (IV)), to synthesize a dication complex, $[(CUHC)_nMX_m]^{2+}\cdot([Y^1]^-)([Y^2]^-)$.

In addition, examples of synthesis of dication complexes are reported in (1) Inorg. Chem. 1987, 26, 383; (2) Anorg. Chem., Org. Chem. 1983, 38B(11), 1501; and (3) J. Organomet. Chem. 1978, 150, 59.

The ratio of $[Y^1]^-$ to $[Y^2]^-$ in $[Y]^-$ of the polycation complex, $[(CUHC)_nMX_m]^{j+}\cdot([Y]^-)_j$, can be controlled as desired. The dication complex may be formed in the polymerization system, or may be prepared prior to the polymerization.

In this case, solvents preferably used include, for example, halogenated hydrocarbons such as dichloromethane, aromatic hydrocarbons such as toluene, benzene and xylene; aliphatic hydrocarbons such as hexane and pentane. As catalyst components, a trication complex, tetracation complex and so on may be used.

In the present invention, a ratio of the amount of the reaction product of Compounds (a) and (b) used to the amount of Compound (b) used, is not particularly limited, but in general may range from 1:0.2 to 1:20, preferably 1:0.5 to 1:5 (molar ratio).

Examples of the polycation complexes as obtained above include the following compounds:
[(Pentamethylcyclopentadienyl)zirconium methyl]-[tetrakis(pentafluorophenyl)borate][trifluoromethanesulfonate]
[(Pentamethylcyclopentadienyl)zirconium methyl]-[tetrakis(pentafluorophenyl)borate][tetraphenylborate]
[(Pentamethylcyclopentadienyl)zirconium methyl]-[tetrakis(pentafluorophenyl)borate]$_2$,
[(Pentamethylcyclopentadienyl)zirconium chloride]-[tetrakis(pentafluorophenyl)borate][trifluoromethanesulfonate]
[(Pentamethylcyclopentadienyl)zirconium chloride]-[tetrakis(pentafluorophenyl)borate][tetraphenylborate],
(Pentamethylcyclopentadienyl)zirconium chloride]tetrakis(pentafluorophenyl)borate]$_2$,
[(Cyclopentadienyl)zirconium methyl]-tetrakis(pentafluorophenyl)borate][trifluoromethanesulfonate],
[(Cyclopentadienyl)zirconium methyl]-tetrakis(pentafluorophenyl)borate][tetraphenylborate],
[(Cyclopentadienyl)zirconium methyl]-[tetrakis(pentafluorophenyl)borate]$_2$,
[(Cyclopentadienylzirconium chloride][tetrakis(pentafluorophenyl)borate][trifluoromethanesulfonate],
[(Cyclopentadienyl)zirconium chloride][tetrakis(pentafluorophenyl)borate][tetraphenylborate],
[(Cyclopentadienyl)zirconium chloride][tetrakis(pentafluorophenyl)borate]$_2$,
[Bis(cyclopentadienyl)zirconium][tetrakis(pentafluorophenyl)borate][trifluoromethanesulfonate],
[Bis(cyclopentadienyl)zirconium][tetrakis(pentafluorophenyl)borate][tetraphenylborate],

[Bis(cyclopentadienyl)zirconium][tetrakis(pentafluorophenyl)borate]$_2$,
[Ethylenebis(indenyl)zirconium][tetrakis(pentafluorophenyl)borate][trifluoromethanesulfonate],
[Ethylenebis(indenyl)zirconium][tetrakis(pentafluorophenyl)borate][tetraphenylborate],
[Ethylenebis(indenyl)zirconium][tetrakis(pentafluorophenyl)borate]$_2$,
[Ethylenebis(tetrahydroindenyl)zirconium][tetrakis(pentafluorophenyl)borate][trifluoromethanesulfonate],
[Ethylenebis(tetrahydroindenyl)zirconium][tetrakis(pentafluorophenyl)borate][teraphenylborate],
[Ethylenebis(tetrahydroindenyl)zirconium][tetrakis(pentafluorophenyl)borate]$_2$,
[Dimethylsilylenebis(cyclopentadienyl)zirconium][tetrakis(pentafluorophenyl)borate][trifluoromethanesulfonate],
[Isopropylidene(cyclopentadienyl)(9-fluorenyl)zirconium][tetrakis(pentafluorophenyl)borate][trifluoromethanesulfonate],
[Dimethylsilylenebis(2,3,5-trimethylcyclopentadienyl)zirconium][tetrakis(pentafluorophenyl)borate] [trifluoromethanesulfonate],
[Zirconium dimethyl][tetrakis(pentafluorophenyl)borate][trifluoromethanesulfonate],
[Zirconium dibenzyl][tetrakis(pentafluorophenyl)borate][trifluoromethanesulfonate],
[Zirconium dimethoxide][tetrakis(pentafluorophenyl)borate][trifluoromethanesulfonate],
[Zirconium diethoxide][tetrakis(pentafluorophenyl)borate][trifluoromethanesulfonate],
[Zirconium dibutoxide][tetrakis(pentafluorophenyl)borate][trifluoromethanesulfonate],
[Zirconium dichloride][tetrakis(pentafluorophenyl)borate][trifluoromethanesulfonate],
[Zirconium dibromide][tetrakis(pentafluorophenyl)borate][trifluoromethanesulfonate],
[Bis(2,5-di-t-butylphenoxy)zirconium][tetrakis(pentafluorophenyl)borate][trifluoromethanesulfonate], and
[Zirconium di(acetylacetonate)][tetrakis(pentafluorophenyl)borate][trifluoromethanesulfonate].

2. Catalyst Component (B):

The polymerization catalysts of the present invention may comprise, as catalysts components, the organoaluminum compound (B) together with the above-mentioned Catalyst Component (A). The use of these catalysts in homopolymerization or copolymerization may improve the polymerization activities.

In the present invention, Organoaluminum Compounds (B) include those represented by the following Formula (V), (VI) or (VII):

$$R^6_r AlQ_{3-r} \qquad (V)$$

wherein $R^6$ is an alkyl group having 1 to 20, preferably 1 to 12 carbon atoms; Q may be the same as or different from each other and is a hydrogen atom, halogen atom, alkoxy group having 1 to 20 carbon atoms or aryl group having 6 to 20 carbon atoms; and r is an integer of 0 to 3.

Examples of compounds represented by Formula (V) are trimethylaluminum, triethylaluminum, triisopropylaluminum, triisobutylaluminum, dimethylaluminum chloride, diethylaluminum chloride, methylaluminum dichloride, ethylaluminum dichloride, dimethylaluminum fluoride, diisobutylaluminum hydride, diethylaluminum hydride and ethylaluminum sesquichloride.

Chain aluminoxanes, Compound (B-2) may be represented by the following Formula:

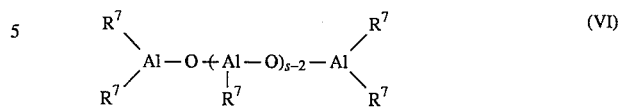
(VI)

wherein $R^7$ may be the same as or different from each other, and is a hydrocarbon group such as an alkyl group, alkenyl group, aryl group or arylalkyl group, having 1 to 20, preferably 1 to 12 carbon atoms, or a halogen atom; and s is a degree of polymerization, usually from 3 to 50, preferably 7 to 40.

Cyclic alkylaluminoxanes having a repeating unit represented by the formula:

(VII)

wherein $R^7$ is defined in Formula (VI); and s is a degree of polymerization, usually from 3 to 50, preferably 7 to 40.

Of these compounds of Formulas (V) to (VII), preferable compounds are alkyl group-containing aluminum compounds having at least one alkyl group containing 3 or more carbon atoms, especially a branched alkyl group. Particularly preferred is triisobutylaluminum or aluminoxane having a polymerization degree of at least 7. The use of triisobutylaluminum, aluminoxane having a polymerization degree of at least 7 or mixtures containing same may result in high activities.

Methods of preparing the above aluminoxanes are not particularly limited to, but include any known methods such as a process comprising contacting one or more of alkylaluminum with a condensation agent such as water. Alkylaluminum and a condensation agent can be reacted by known methods, for example, (1) a method comprising dissolving an organoaluminum compound in an organic solvent, and contacting the solution with water; (2) a method comprising adding an organoaluminum compound to starting materials for polymerization, and adding water to the reaction mixture later; (3) a method comprising reacting an organoaluminum compound with crystalline water contained in a metal salt and the like or water adsorbed to an inorganic material or an organic material; and (4) a method comprising reacting tetraalkyldialuminoxane with trialkylaluminum, and then reacting the reaction product with water. In addition, aluminoxanes may be those insoluble to toluene.

In the case of using Component (B), the amount of Component (B) used may range 1 to 2,000, preferably 5 to 1,000, more preferably 10 to 500 moles per one mole of Component (A). The use of Compound (B) may improve polymerization activity. However, the use of excess amount of Compound (C) is not desirable since the organoaluminum compound will be used in vain and a great amount of the organoaluminum compound will remain in the resultant polymer. In addition, in the case of using aluminoxane, the use amount can also be reduced.

Further, Component (B) may be contacted with the polymerization catalyst of the present invention. Such contact may be conducted prior to the polymerization or in the polymerization system.

3. Catalyst Component (C):

The polymerization catalysts of the present invention may comprise, as a catalyst component, Lewis acid (C) together with the above-mentioned Catalyst Component (A). The Lewis acids are not particularly limited to, but include organic substances and solid inorganic substances. The preferable organic substances include boron compounds and aluminum compounds. The preferable inorganic substances include magnesium compounds.

The aluminum compounds include, for example, bis(2,6-di-t-butyl-4-methyl)aluminum methyl and (1,1'-di-2-naphthoxy)aluminum methyl. The magnesium compounds include, for example, magnesium chloride and magnesium diethoxide. The boron compounds include, for example, triphenylborane, tris(pentafluorophenyl)borane, tris[3,5-bis-(trifluoromethyl)phenyl]borane, tris[(4-fluoromethyl)phenyl]borane, trimethylborane, triethylborane, tri(n-butyl)borane, tris(fluoromethyl)borane, tris(pentafluoroethyl)borane, tris(nanofluorobutyl)borane, tris(2,4,6-trifluorophenyl)borane, tris(3,5-difluorophenyl)borane, bis(pentafluorophenyl)fluoroborane, diphenylfluoroborane, bis(pentafluorophenyl)chloroborane, dimethylfluoroborane, diethylfluoroborane, di(n-butyl)fluoroborane, (pentafluorophenyl)difluoroborane, phenyldifluoroborane, (pentafluorophenyl)difluoroborane, phenyldifluoroborane, (pentafluorophenyl)dichloroborane, methyldifluoroborane, ethyldifluoroborane and (n-butyl)difluoroborane.

Of these compounds, tris(pentafluorophenyl)borane is particularly preferred.

4. Catalyst Component (D):

In the polymerization catalyst of the present invention, any one of the above-mentioned Catalyst Components (A), (B) and (C) may be supported on a carrier. The carrier [Catalyst Component (D)] are not particularly limited to, but include inorganic carriers, inorganic oxide carriers and organic carriers. Of these, inorganic carriers and inorganic oxide carriers are particularly preferable.

More specifically, the inorganic carriers include magnesium compounds or their complex salts such as $MgCl_2$, $MgCl(OEt)$ and $Mg(OEt)_2$, and organic magnesium compounds such as those represented by $MgR^{13}_x X^1_y$. As used herein, $R^{13}$ is an alkyl group having 1 to 20 carbon atoms, an alkoxy group having 1 to 20 carbon atoms or an aryl group having 6 of 20 carbon atoms; $X^1$ is a halogen atom or an alkyl group having 1 to 20 carbon atoms; x is a number of 0 to 2; and y is a number of 0 to 2.

The inorganic oxide carriers include $SiO_2$, $Al_2O_3$, $MgO$, $ZrO_2$, $TiO_2$, $Fe_2O_3$, $B_2O_3$, $CaO$, $ZnO$, $BaO$, $ThO_2$ and mixtures thereof such as silica alumina, zeolite, ferrite and glass fibers. Of these, $SiO_2$ and $Al_2O_3$ are particularly preferable. In addition the above-mentioned inorganic oxide carriers may contain a small amount of carbonates, nitrates, sulfides or the like.

Further, the organic carriers include, for example, polymers such as polystyrene, styrene-divinylbenzene copolymers, polyethylene, linear low density polyethylene, polypropylene, poly-4-methyl-1-pentene, substituted polystyrene and polyarylate, starches and carbon.

The size of the carrier [Compound (D)], is dependent upon its kind and its production process. The average particle size may usually range from 1 to 300 μm, preferably from 10 to 200 μm, more preferably from 20 to 100 μm.

If the average particle size is small, small particles in the resultant polymers will increase. If the average particle size is large, large particles in the resultant polymers will increase. This results in decrease in bulk density and clogging of a hopper.

Further, the specific surface area of Carrier [Compound (D)] may be usually from 1 to 1,000 $m^2/g$, preferably from 50 to 500 $m^2/g$. The pore volume may be usually from 0.1 to 5 $cm^3/g$, preferably from 0.3 to 3 $cm^3/g$. If the specific surface area or the pore volume is outside of the above ranges, the catalyst activity may be decreased. In addition, the specific surface area and the pore volume can be, for example, measured from volume of nitrogen gas adsorbed in accordance with the BET method (Refer to "J. Am. Chem. Soc., Vol. 60, Page 309 (1983)").

Furthermore, the above-mentioned Carrier [Compound (D)] is preferably used after being calcined at 150° to 1,000° C., preferably at 200° to 800° C.

The olefin polymerization catalysts of the present invention are those comprising, as main components, the reaction product of Compounds (a) and (b), and Compound (b) wherein at least one of Compound (a) (or the reaction compound) and Compound (b), preferably both of Compound (a) (or the reaction compound) and Compound (b) are supported on the above-mentioned Carrier [Compound (D)].

Methods of having Compound (a) (or the reaction product), and/or Compound (b) supported on the above-mentioned Carrier (D) are not particularly limited to, but include the following methods (1) to (6).

(1) A method of mixing Compound (a) (or the reaction product) and/or Compound (b) with Carrier (D);

(2) A method of treating Carrier (D) with an organoaluminum compound or a halogen-containing silicon compound, and then mixing Compound (a) (or the reaction product) and/or Compound (b) with the treated Carrier (D) in an inert solvent;

(3) A method of reacting Carrier (D), Compound (a) (or the reaction product) and/or Compound (b), and an organoaluminum compound or a halogen-containing silicon compound;

(4) A method of having Compound (a) (or the reaction product) or Compound (b) supported on Carrier (D), and then mixing Compound (a) (or the reaction product) or Compound (b) with the treated Carrier (D);

(5) A method of mixing a contact product of Compound (a) (or the reaction product) and Compound (b) with Carrier (D); and (6) A method of reacting Compound (a) (or the reaction compound) with Compound (b) in the presence of Carrier (D).

In addition, in the reaction of the above Method (4), (5) or (6), the above-mentioned Organoaluminum Compound (B) can be added to the reaction system.

The catalysts obtained as above can be used as is for polymerization without any treatment or can be used as a solid after removing the solvent.

Further, in the present invention, the catalyst can be prepared by having Compound (a), the reaction product of Compound (a) and (b) and/or Compound (b) supported on Carrier (D) in the polymerization system. Further, prepolymerization may be carried out at −20° C. to 100° C. for 1 minute to 2 hours while an olefin such as ethylene is introduced to keep a pressure of from normal pressure to 20 $Kg/cm^2$, to prepare catalysts particles.

In the present invention, a mixing ratio (weight ratio) of Compound (b) to Carrier (D) may preferably be from 1:5 to 1:10,000, more preferably from 1:10 to 1:500.

In the present invention, a mixing ratio (weight ratio) of Compound (a) to Carrier (D) may preferably be from 1:5 to 1:10,000, more preferably from 1:10 to 1:500.

If the mixing ratio of Compound (b) to Carrier (D) or the mixing ratio of Compound (a) to Carrier (D) is outside of the above ranges, the activity may be decreased.

The olefin polymerization catalysts of the present invention, prepared as above, may have an average particle size of usually from 2 to 200 μm, preferably from 10 to 150 μm, more preferably from 20 to 100 μm; and a specific surface area of usually from 20 to 1,000 m$^2$/g, preferably from 50 to 500 m$^2$/g. If the average particle size is less than 2 μm, small particles in the resultant polymers may increase. If the average particle size is more than 200 μm, large particles in the resultant polymers may increase. If the specific surface area is less than 20 m$^2$/g, the activity may be decreased. If the specific surface are is more than 1000 m$^2$/g, the bulk density of the resultant polymers may be decreased.

Further, in the catalysts of the present invention, the amount of the transition metal contained in 100 g of the carrier may usually be from 0.05 to 10 g, preferably from 0.1 to 2 g. If the amount of the transition metal is outside of the above ranges, the activity may be decreased.

As mentioned above, the use of Carrier (D) may result in the resultant polymers having high bulk density and excellent particle size distribution, which are industrially useful.

5. Production Process of Polymers:

According to the process for producing the polymers of the present invention, homopolymerization of an olefin alone, or copolymerization of an olefin and ethylene, the other olefin or the other unsaturated compounds is carried out in the presence of the above-mentioned polymerization catalyst.

In this case, the kind of olefins are not particularly limited. But, alpha-olefins having 2 to 20 carbon atoms are preferable. More specifically, suitable alpha-olefins include, for example, ethylene, propylene, 1-butene, 3-methyl-1-butene, 1-pentene, 1-hexene, 4-methyl-1-pentene, 1-octene, 1-decene, 1-dodecene, 1-tetradecene, 1-hexadecene, 1-octadecene, 1-eicosene, styrene, p-methylstyrene, p-chlorostyrene, p-t-butylstyrene, p-phenylstyrene, p-methylsilylstyrene and p-trimethylsilylstyrene.

In the present invention, when two or more of alpha-olefins are copolymerized, any combination of the above monomers can be used. In the case of copolymerizing ethylene and an alpha-olefin having 3 to 10 carbon atoms, a molar ratio of ethylene to the other alpha-olefins may be usually 99.9:0.1 to 60.0:40.0, preferably 99.5:0.5 to 75.0:25.0.

In the present invention, in addition to the above alpha-olefins, it is possible to polymerize, or copolymerize with the other unsaturated compounds such as chain diolefins such as butadiene, isoprene and 1,5-hexadiene, cyclic olefins such as norbornene and 1,4,5,8-dimethano-1,2,3,4,4a,5,8,8a-octahydronaphthalene, cyclic diolefins such as norbornadiene and ethylidene norbornene, unsaturated esters such as ethylacrylate and methylmethacrylate, and lactones such as beta-propiolactone, beta-butyrolactone and gamma-butyrolactone.

In general, the amount of the other unsaturated compounds may be not greater than 20 mole percent based on the amount of the olefin. In this case, one or more olefins may preferably be used.

Polymerization methods are not particularly limited to, but include slurry polymerization, gas phase polymerization, bulk polymerization, solution polymerization and suspension polymerization. Slurry polymerization and gas phase polymerization are particularly preferred.

As for polymerization conditions, the polymerization temperature may range from −100° to 250° C., preferably from −50° to 200° C., more preferably from 0° to 130° C. Further, the catalyst is preferably used in an amount to provide a starting monomer/Component (A) molar ratio or a starting monomer/Component (B) molar ratio of from 1 to 10$^8$, preferably from 100 to 10$^5$. The polymerization time may usually range from 5 minutes to 10 hours. The reaction pressure may range from normal pressure to 100 Kg/cm$^2$G, preferably from normal pressure to 30 Kg/cm$^2$G.

The molecular weight of the resultant polymer can be controlled by appropriately selecting the amount of each catalyst component and polymerization temperature, or by a polymerization reaction in the presence of hydrogen.

In the case of using polymerization solvents, suitable solvents include aromatic hydrocarbons such as benzene, toluene, xylene and ethylbenzene; alicyclic hydrocarbons such as cyclopentane, cyclohexane and methylcyclohexane; aliphatic hydrocarbons such as pentane, hexane, heptane and octane; and halogenated hydrocarbons such as chloroform and dichloromethane. These solvents can be used alone or in combination. Monomers such as alpha-olefins can also be used as solvent. In addition, the polymerization can be carried out in the absence of a solvent.

In the polymerization process of the present invention, pre-polymerization can be carried out in the presence of the catalyst according to the present invention.

The pre-polymerization can be carried out by any known methods such as a method of bringing a small amount of olefins into contact with the solid catalyst components.

The olefins which can be used in the pre-polymerization are not particularly limited to, but include those olefins mentioned above such as ethylene, $C_{3-20}$ alpha-olefins or mixtures thereof. It is preferable to use, for the pre-polymerization, the same olefin used in the subsequent polymerization.

Further, the pre-polymerization temperature may usually range from −20° to 100° C., preferably from −10° to 70° C., more preferably from 0° to 50° C.

In the pre-polymerization, inert hydrocarbons, aliphatic hydrocarbons, aromatic hydrocarbons, monomers or the like, can be used as a solvent. Of these, aliphatic hydrocarbons are particularly preferable. In addition, the pre-polymerization can be carried out in the absence of a solvent.

In the pre-polymerization, it is preferable to adjust conditions so that the intrinsic viscosity of the pre-polymer (measured at 135° C. in decalin) ranges at least 0.2 dl/g, preferably at least 0.5 dl/g, and that the yield of the prepolymer ranges from 1 to 10,000 g, preferably from 10 to 1,000 g per 1 millimoles of the transition metal component in the catalyst used.

As mentioned above, the polymerization catalysts according to the present invention show high activities, and the resultant olefin homopolymer or copolymer of olefins produced using the catalysts, will have high molecular weight, and narrow comonomber distribution. Also, the molecular weight and the molecular weight distribution can be controlled. Further, the polymers or copolymers having excellent properties can be effectively produced without using a great amount of an organometallic compound.

EXAMPLES

The present invention will be described in more detail with reference to the following Examples and Comparative Examples, which are not used to limit the present invention.

In addition, in the Examples and the Comparative

Examples, the measurements for the physical properties were conducted as follows. The results are as shown in Table 2 or 4.

Intrinsic Viscosity [η]: Measured at 135° C. in decalin.
The measurement conditions for GPC were as follows.
Equipment: ALC/GPS 150C Manufactured by Waters
Column: TSK HM+GMH6X2 Manufactured by Toso
Solvent: 1,2,4-trichlorobenzene
Polyethylene conversion.
DSC (Differential Scanning Calorimeter)
First Heating: From room temperature to 190° C., 10° C./min., kept for 3 min.
First Cooling: From 190° C. to room temperature, 10° C./min., kept for 3 min.
Second Heating: From room temperature to 190° C., 10° C./min.

1. Preparation of Polymerization Catalyst:

(1) Preparation of $[Cp_2Zr][OTf]_2$:

*[OTf]⁻Trifluoromethanesulfonate

In 10 ml of dry toluene, 0.0585 g of bis(cyclopentadienyl)zirconium dichloride ($Cp_2ZrCl_2$) were added to prepare Solution A (0.02 M/L), and in 10 ml of dry toluene, 0.10 g of silver trifluoromethanesulfonate (AgOTf) were added to prepare Solution B (0.04 M/L), respectively. At room temperature, Solution B was gradually added dropwise to Solution A. The silver chloride obtained (solid) was filtered off to obtain a 0.01 M/L solution containing $[Cp_2Zr][OTf]_2$.

(2) Preparation of $[CpZrCl][OTf]_2$

In 10 ml of dry toluene, 0.0525 g of cyclopentadienylzirconium trichloride ($CpZrCl_3$) were added to prepare Solution A (0.02 M/L), and in 10 ml of dry toluene, 0.103 g of silver trifluoromethanesulfonate (AgOTf) were added to prepare Solution B (0.04 M/L), respectively. At room temperature, Solution B was gradually added dropwise to Solution A. The silver chloride obtained (solid) was filtered off to obtain a 0.01 M/L solution containing $[CpZrCl][OTf]_2$.

(3) Preparation of $[Et(Ind)_2Zr][OTf]_2$:

In 10 ml of dry toluene, 0.0836 g of ethylenebis(indenyl)zirconium trichloride $(Ind)_2ZrCl_2$ were added to prepare Solution A (0.02 M/L), and in 10 ml of dry toluene, 0.103 g of silver trifluoromethanesulfonate (AgOTf) were added to prepare Solution B (0.04 M/L), respectively. At room temperature, Solution B was gradually added dropwise to Solution A. The silver chloride obtained (solid) was filtered off to obtain a 0.01M/L solution containing $[Et(Ind)_2Zr][OTf]_2$.

(4) Preparation of $[IPr(Cp-Flu)Zr][OTf]_2$:

In 10 ml of dry toluene, 0.0865 g of isopropylidene(cyclopentadienyl-fluorenyl)zirconium dichloride ($IPr(Cp-Flu)ZrCl_2$) were added to prepare Solution A (0.02 M/L), and in 10 ml of dry toluene, 0.103 g of silver trifluoromethanesulfonate (AgOTf) were added to prepare Solution B (0.04 M/L), respectively. At room temperature, Solution B was gradually added dropwise to Solution A. The silver chloride obtained (solid) was filtered off to obtain a 0.01 M/L solution containing $[IPr(Cp-Flu)Zr][OTf]_2$.

(5) Preparation of $[\{C_5(Me)_4\}SiMe_2N(tBu)Ti][OTf]_2$:

In 10 ml of dry toluene, 0.0737 g of (t-butylamido)dimethyl(tetramethyl-$\eta^5$-dicyclopentadienyl)silanetitanium dichloride $\{C_5(Me)_4\}SiMe_2N(tBu)TiCl_2$ were added to prepare Solution A (0.02 M/L), and in 10 ml of dry toluene, 0.103 g of silver trifluoromethanesulfonate (AgOTf) were added to prepare Solution B (0.04 M/L), respectively. At room temperature, Solution B was gradually added dropwise to Solution A. The silver chloride obtained (solid) was filtered off to obtain a 0.01 M/L solution containing (t-butylamido)dimethyl(tetramethyl-$\eta^5$-dicyclopentadienyl)silanetitanium ditriflate ($[\{C_5(Me)_4\}SiMe_2N(tBu)Ti][OTf]_2$).

(6) Preparation of $[ZrCl_2][OTf]_2$:

In 10 ml of dry toluene, 0.0466 g of zirconium tetrachloride ($ZrCl_4$) were added to prepare Solution A (0.02 M/L), and in 10 ml of dry toluene, 0.103 g of silver trifluoromethanesulfonate (AgOTf) were added to prepare Solution B (0.04 M/L), respectively. At room temperature, Solution B was gradually added dropwise to Solution A. The silver chloride obtained (solid) was filtered off to obtain a 0.01 M/L solution containing dichlorozirconium ditriflate ($[ZrCl_2][OTf]_2$).

(7) Preparation of $[Cp_2Ti][OTf]_2$:

In 10 ml of dry toluene, 0.0498 g of bis(cyclopentadienyl)titanium dichloride ($Cp_2TiCl_2$) were added to prepare Solution A (0.02 M/L), and in 10 ml of dry toluene, 0.103 g of silver trifluoromethanesulfonate (AgOTf) were added to prepare Solution B (0.04 M/L), respectively. At room temperature, Solution B was gradually added dropwise to Solution A. The silver chloride obtained (solid) was filtered off to obtain a 0.01M/L solution containing bis(cyclopentadienyl)titanium ditriflate ($[Cp_2Ti][OTf]_2$).

(8) Preparation of $[Cp_2Hf][OTf]_2$:

In 10 ml of dry toluene, 0.0585 g of bis(cyclopentadienyl)hafnium dichloride ($Cp_2HfCl_2$) were added to prepare Solution A (0.02 M/L), and in 10 ml of dry toluene, 0.103 g of silver trifluoromethanesulfonate (AgOTf) were added to prepare Solution B (0.04 M/L), respectively. At room temperature, Solution B was gradually added dropwise to Solution A. The silver chloride obtained (solid) was filtered off to obtain a 0.01 M/L solution containing bis(cyclopentadienyl)hafnium ditriflate ($[Cp_2Hf][OTf]_2$).

(9) Preparation of $[Cp_2Zr][BPh_4]_2$:

In 10 ml of dry toluene, 0.0585 g of bis(cyclopentadienyl)zirconium dichloride ($Cp_2ZrCl_2$) were added to prepare Solution A (0.02 M/L), and in 10 ml of dry toluene, 0.103 g of silver tetraphenylborate ($AgBPh_4$) were added to prepare Solution B (0.04 M/L), respectively. At room temperature, Solution B was gradually added dropwise to Solution A. The silver chloride obtained (solid) was filtered off to obtain a 0.01M/L solution containing dicyclopentadienylzirconium bis(tetraphenylborate) ($[Cp_2Zr][BPh_4]_2$).

2. Olefin Polymerization:

(1) Examples 1

To a 1.4-liter autoclave, under a nitrogen stream, at room temperature, 400 ml of dry toluene as solvent and 1 mmol of triisobutyl aluminum (TIBA) (0.05 M/L toluene solution) were added and the mixture was well stirred. The mixture was heated to 60° C. Then, to this, 1 μmol of [Cp$_2$Zr][OTf]$_2$ prepared in Step 1(1) and 1 μmol of dimethylanilinium (tetrapentafluorophenyl)borate ([PhNMe$_2$H][B(C$_6$F$_5$)$_4$]) were added and the mixture was well stirred. Then, the mixture was heated to 80° C. while ethylene was introduced, and the polymerization was carried out for one hour while the ethylene pressure was kept at 8 kg/cm$^2$.

After the completion of the reaction, the reaction mixture was subjected to methanol deashing, washing and drying, to obtain 59 g of polyethylene. The results of measurements of the melting point, intrinsic viscosity and molecular weight measured by GPC, of the resultant polyethylene, are as shown in Table 2.

(2) Example 2

To a 10-ml shlenk, under a nitrogen stream, at room temperature, 1 ml of [Cp$_2$Zr][OTf]$_2$ (0.01mol/l-toluene solution) prepared in Step 1 (1) and 1 ml of [PhNMe$_2$H][B(C$_6$F$_5$)$_4$] were added and the mixture was stirred for 6 hours.

The polymerization was carried out for one hour in the same manner as in Example 1 except that 0.2 ml (equivalent to 1 μmol-Z) out of 2 ml of the solution obtained were used instead of [Cp$_2$Zr][OTf]$_2$ and [PhNMe$_2$H][B(C$_6$F$_5$)$_4$].

After the completion of the reaction, the reaction mixture was subjected to methanol deashing, washing and drying, to obtain 23 g of polyethylene. The results of measurements of the melting point, intrinsic viscosity and molecular weight measured by GPC, of the resultant polyethylene, are as shown in Table 2.

TABLE 1

| Examples | Catalyst Kind of Cat. | μmol | Ionic Complex μmol | TIBA mmol | Toluene ml | Ethylene kg/cm$^2$ | Propylene kg/cm$^2$ | 1-Octene ml | Temp. °C. | Time hr |
|---|---|---|---|---|---|---|---|---|---|---|
| Ex. 1 | [Cp$_2$Zr][OTf]$_2$ | 1 | 1 | 1 | 400 | 8 | — | 0 | 80 | 1 |
| Ex. 2 | [Cp$_2$Zr][OTf][B(C$_6$F$_5$)$_4$] | 1 | 0 | 1 | 400 | 8 | — | 0 | 80 | 1 |
| Comp. Ex. 1 | [Cp$_2$Zr][OTf]$_2$ | 1 | 0 | 1 | 400 | 8 | — | 0 | 80 | 1 |
| Comp. Ex. 2 | [Cp$_2$Zr][OTf]$_2$ | 100 | 0 | 1 | 400 | 8 | — | 0 | 80 | 1 |
| Comp. Ex. 3 | Cp$_2$ZrCl$_2$ | 100 | 0 | 1 | 400 | 8 | — | 0 | 80 | 1 |
| Ex. 3 | [Cp$_2$Zr][OTf]$_2$ | 1 | 1 | 1 | 360 | 8 | — | 40 | 80 | 2/3 |
| Ex. 4 | [Cp$_2$Zr][OTf]$_2$ | 0.5 | 0.5 | 1 | 360 | 4 | — | 40 | 80 | 1 |
| Comp. Ex. 4 | Cp$_2$ZrCl$_2$ | 1 | 1 | 1 | 360 | 8 | — | 40 | 80 | 1 |
| Ex. 5 | [CpZrCl][OTf]$_2$ | 1 | 1 | 1 | 400 | 8 | — | 0 | 80 | 1 |
| Ex. 6 | [CpZrCl][OTf]$_2$ | 1 | 2 | 1 | 400 | 8 | — | 0 | 80 | 1 |
| Ex. 7 | [CpZrCl][OTf]$_2$ | 1 | 1 | 1 | 360 | 8 | — | 40 | 80 | 1 |
| Comp. Ex. 5 | CpZrCl$_3$ | 6 | 6 | 6 | 400 | 3 | — | 31 | 70 | 1 |
| Ex. 8 | [Et(Ind)$_2$Zr][OTf]$_2$ | 2 | 2 | 1 | 400 | — | 3 | — | 30 | 3 |
| Comp. Ex. 6 | Et(Ind)$_2$ZrCl$_2$ | 2 | MAO:1.25 mmol | — | 500 | — | 3 | — | 34 | 1 |
| Ex. 9 | [Et(Ind)$_2$Zr][OTf]$_2$ | 1 | 1 | 1 | 360 | 8 | — | 40 | 80 | 1 |
| Ex. 10 | [Et(Ind)$_2$Zr][OTf]$_2$ | 0.5 | 0.5 | 1 | 360 | 8 | — | 40 | 80 | 1 |
| Ex. 11 | [IPr(Cp—Flu)Zr][OTf]$_2$ | 5 | 5 | 1 | 400 | — | 3 | — | 20 | 1 |
| Ex. 12 | [IPr(Cp—Flu)Zr][OTf]$_2$ | 5 | 5 | 1 | 400 | — | 8 | — | 20 | 1.6 |
| Comp. Ex. 7 | IPr(Cp—Flu)ZrCl$_2$ | 5 | 5 | 1 | 400 | — | 3 | — | 20 | 1 |
| Ex. 13 | [IPr(Cp—Flu)Zr][OTf]$_2$ | 1 | 1 | 1 | 360 | 8 | — | 40 | 80 | 2.5 |

*[OTf]: CF$_3$SO$_3$ trifluoromethane sulfonic acid anion
*Ionic Complex: [PhNMe$_2$H][B(C$_6$F$_5$)$_4$]
*In Example 2, after [Cp$_2$Zr][OTf]: and Ionic Complex [PhNMe$_2$H][B(C$_6$F$_5$)$_4$] were pre-mixed to prepare a catalyst, TIBA was added.
*[Cp$_2$Zr]: Dicyclopentadienylzirconium dication
[CpZrCl]: Dicyclopentadienylchlorozirconium dication
[Et(Ind)$_2$Zr]: Ethylenebis(η$^5$-indenyl)zirconium dication
[IPr(Cp—Flu)Zr]: Isopropylidene(cyclopentadienyl-fluorenyl)zirconium dication

TABLE 2

| Exampls | Yield g | Melting Point °C. | [η] dl/g | 1-Octene Content mol % | Molecular Weight | | |
|---|---|---|---|---|---|---|---|
| | | | | | Mw | Mn | Mw/Mn |
| Ex. 1 | 59 | 138.8 | 2.42 | — | 142,000 | 60,000 | 2.4 |
| Ex. 2 | 23 | 138.4 | 4.86 | — | 264,000 | 120,000 | 2.2 |
| Comp. Ex. 1 | 0.001 | — | — | — | — | — | — |
| Comp. Ex. 2 | 0.38 | — | — | — | — | — | — |
| Comp. Ex. 3 | 0 | — | — | — | — | — | — |
| Ex. 3 | 63 | 119.2 | 2.38 | 2.0 | 124,000 | 64,000 | 2.0 |
| Ex. 4 | 13 | 114.0 | 2.53 | 3.0 | 142,000 | 74,000 | 1.9 |
| Comp. Ex. 4 | 65 | 117.0 | 2.80 | 1.3 | 143,000 | 63,000 | 2.3 |
| Ex. 5 | 11 | 138.0 | 4.51 | — | 259,000 | 95,000 | 2.7 |
| Ex. 6 | 12 | 138.7 | 4.20 | — | 294,000 | 120,000 | 2.5 |
| Ex. 7 | 9 | 122.8 | 4.16 | 0.7 | 310,000 | 129,000 | 2.4 |

TABLE 2-continued

| Examples | Yield g | Melting Point °C. | [η] dl/g | 1-Octene Content mol % | Molecular Weight | | |
|---|---|---|---|---|---|---|---|
| | | | | | Mw | Mn | Mw/Mn |
| Comp. Ex. 5 | 14 | 113 | 2.7 | 1.8 | 240,000 | 92,000 | 2.6 |
| Ex. 8 | 249 | 141.7 | 0.69 | — | 30,000 | 15,000 | 2.0 |
| Comp. Ex. 6 | 51 | 136 | 0.47 | — | 29,000 | 11,000 | 2.6 |
| Ex. 9 | 176 | 123.6 | 0.99 | 4.2 | 48,000 | 7,000 | 6.8 |
| Ex. 10 | 116 | 109.5 | 1.47 | 4.9 | 95,000 | 37,000 | 2.6 |
| Ex. 11 | 4.4 | 144.7 | 1.00 | — | 84,000 | 47,000 | 1.8 |
| Ex. 12 | 150 | 144.3 | 1.34 | — | 77,000 | 37,000 | 2.1 |
| Comp. Ex. 7 | 73 | 141 | 1.38 | — | 79,000 | 39,500 | 2.0 |
| Ex. 13 | 110 | 126.9 | 1.51 | 3.9 | 84,000 | 16,500 | 5.1 |

TABLE 3

| Examples | Catalyst Kind of Cat. | μmol | Ionic Complex μmol | TIBA mmol | Toluene ml | Ethylene kg/cm$^2$ | Propylene kg/cm$^2$ | 1-Octene ml | Temp. °C. | Time hr |
|---|---|---|---|---|---|---|---|---|---|---|
| Ex. 14 | [Cp*SiNTi][OTf]$_2$ | 1 | 1 | 1 | 400 | 8 | — | 0 | 80 | 0.15 |
| Ex. 15 | [Cp*SiNTi][OTf]$_2$ | 0.5 | 0.5 | 1 | 360 | 8 | — | 40 | 80 | 1 |
| Comp. Ex. 8 | Cp*SiNTiCl$_2$ | 0.5 | 0.5 | 1 | 360 | 8 | — | 40 | 80 | 1 |
| Ex. 16 | [ZrCl$_2$][OTf]$_2$ | 1 | 1 | 1 | 400 | 8 | — | 0 | 80 | 1 |
| Ex. 17 | [ZrCl$_2$][OTf]$_2$ | 1 | 1 | 1 | 360 | 8 | — | 40 | 80 | 1 |
| Comp. Ex. 9 | ZrCl$_4$ | 3 | 3 | 1 | 400 | 8 | — | 0 | 80 | 1 |
| Ex. 18 | [Cp$_2$Ti][OTf]$_2$ | 1 | 1 | 1 | 400 | 8 | — | 0 | 80 | 1 |
| Comp. Ex. 10 | Cp$_2$TiCl$_2$ | 1 | 1 | 1 | 400 | 8 | — | 0 | 80 | 1 |
| Ex. 19 | [Cp$_2$Hf][OTf]$_2$ | 1 | 1 | 1 | 400 | 8 | — | 0 | 80 | 1 |
| Comp. Ex. 11 | Cp$_2$HfCl$_2$ | 1 | 1 | 1 | 400 | 8 | — | 0 | 80 | 1 |

*[Cp*SiNTi]: {C$_5$(Me)$_4$}SiMe$_2$N(tBu)Ti$^{2+}$, ((t-butylamido)dimethyl(tetramethyl-η$^5$-cyclopentadienyl silanetitanium dication)
*[ZrCl$_2$]: Dichlorozirconium dication
*[Cp$_2$Ti]: Dicyclopentadienyltitanium dication
*[Cp$_2$Hf]: Dicyclopentadienylhafnium dication

TABLE 4

| Examples | Yield g | Melting Point °C. | [η] dl/g | 1-Octene Content mol % | Molecular Weight | | |
|---|---|---|---|---|---|---|---|
| | | | | | Mw | Mn | Mw/Mn |
| Ex. 14 | 21 | 136.1 | 5.74 | — | 37,000 | 14,800 | 2.5 |
| Ex. 15 | 48 | — | 2.55 | 11.3 | 17,000 | 8,100 | 2.1 |
| Comp. Ex. 8 | 40 | — | 2.31 | 11.8 | 12,000 | 4,800 | 2.5 |
| Ex. 16 | 7.3 | 135.8 | 3.89 | — | 228,000 | 114,000 | 2.0 |
| Ex. 17 | 1.0 | 122.9 | 6.41 | 0.8 | 350,000 | 130,000 | 2.7 |
| Comp. Ex. 9 | 6.0 | 134.7 | 2.99 | — | 116,000 | 46,400 | 2.5 |
| Ex. 18 | 3.6 | — | — | — | — | — | — |
| Comp. Ex. 10 | 2.3 | — | — | — | — | — | — |
| Ex. 19 | 10.7 | — | — | — | — | — | — |
| Comp. Ex. 11 | 9.2 | — | — | — | — | — | — |

(3) Examples 3 to 19 and Comparative Examples 1 to 11

The polymerization was carried out in the same manner as in Example 1 except that those conditions as indicated in Table 1 and 2 were used as polymerization conditions.

The results are as shown in Table 2 and Table 4.

(4) Example 20

The polymerization was carried out in the same manner as in Example 1 except that 1 mmol of triphenylaluminum (Ph3Al) (1 mol/l-toluene solution) was added instead of TIBA.

After the completion of the reaction, the reaction mixture was subjected to methanol deashing, washing and drying, to obtain 14 g of polyethylene. The intrinsic viscosity of the resultant polyethylene is as shown in Table 5.

(5) Examples 21 and 22

The polymerization was carried out in the same manner as in Example 20 except that as polymerization conditions, the kind of the catalysts and olefins used, those as indicated in Table 5 were used.

The results are as shown in Table 5.

TABLE 5

| Run | Kind of Catalysts | μmol | Ionic Complex μmol | Ph$_3$Al mmol | Ethylene Pressure kg/cm$^2$G | Yield g | [η] dl/g |
|---|---|---|---|---|---|---|---|
| Ex. 20 | [Cp$_2$Zr][OTf]$_2$ | 1 | 1 | 1 | 8 | 14 | 3.27 |
| Ex. 21 | [Cp$_2$Ti][OTf]$_2$ | 1 | 1 | 1 | 8 | 3.3 | 5.22 |
| Ex. 22 | [Cp*SiNTi][OTf]$_2$ | 1 | 1 | 1 | 8 | 10 | 4.63 |

Toluene: 400 ml, Temp.: 80° C., polymerization time: 1 hour
[Cp*SiNTi]: {C$_5$(Me$_4$)}SiMeN(tBu)Ti$^{2+}$ (t-butylamido)dimethyl(tetramethyl-η5-cyclopentadienyl)silanetitanium dication (6) Example 23

The polymerization was carried out in the same manner as in Example 1 except that before introducing ethylene, 1 μmol of tris(pentafluorophenyl)borate (B(C$_6$F$_5$)$_3$) (0.01 mol/l toluene solution) were added and the mixture was well stirred.

After the completion of the reaction, the reaction mixture was subjected to methanol deashing, washing and drying, to obtain 51 g of polyethylene. The intrinsic viscosity of the resultant polyethylene was 3.21.

(7) Example 24

A 200 ml flask purged with nitrogen was charged with 2.3 g of silica calcined at 300° C. for 4 hours (average particle size: 70 μm, specific surface volume: 260 m$^2$/g, pore volume: 260 cc/g), 100 ml of a toluene solution (0.01 mol/l) containing [Cp$_2$Ti][OTf]$_2$ prepared in Step 1 (1), 5 mmol of triisobutylaluminum (TIBA) and 2 mmol of dimethylanilinium tetrakis(pentafluorophenyl)borate. The reaction was carried out with agitation at room temperature for one hour. Then, toluene was removed under reduced pressure to obtain a solid catalyst.

Thereafter, to 1.4-liter autoclave, together with 400 ml of toluene and 1 mmol of TIBA, the solid catalyst obtained as above (3 μmol in terms of titanium) was added. Further, at 80° C., while ethylene was continuously supplied to the autoclave at an ethylene pressure of 8 kg/cm$^2$, the polymerization was carried out for one hour, to obtain 30.1 g of a polymer.

The intrinsic viscosity of the polymer obtained was 3.78.

(8) Example 25

The polymerization was carried out in the same manner as in Example 1 except that [Cp$_2$Zr][BPh$_4$]$_2$ prepared in Step 1 (9) was used instead of [Cp$_2$Zr][OTf]$_2$.

After the completion of the reaction, the reaction mixture was subjected to methanol deashing, washing and drying, to obtain 57 g of polyethylene. The polyethylene obtained had an intrinsic viscosity of 2.36, a weight average molecular weight of 141,000 and a molecular weight distribution of 2.1.

What is claimed is:

1. A polymerization catalyst comprising a polycation complex (A) represented by the following Formula (I):

$$[(CUHC)_nMX_m]^{j+}([Y]^-)_j \qquad (I)$$

wherein M is a metal of Group 4 of the Periodic Table;
CUHC is each independently a cyclic unsaturated hydrocarbon group, wherein two or more of CUHC may form a bridge structure;
X is each independently a σ-bond ligand, a chelate ligand or a Lewis base;
CUHC and X may form a bridge structure;
j is 2;
n is an integer of from 0 to 2;
m is an integer of from 0 to 6;
n+m=[(the valency of M)–j] wherein when X is a chelate ligand, n+m=[(the valency of M)–j–1]; and
[Y]$^-$ is a noncoordinating anion selected from the group consisting of [Y$^1$]$^-$, [Y$^2$]$^-$ and a mixture thereof where
[Y$^1$]$^-$ is a noncoordinating anion wherein a plurality of groups are attached to an element belonging to Groups 13 to 15 of the Periodic Table; and
[Y$^2$]$^-$ is a noncoordinating anion selected from the group consisting of a conjugate base of a Brønsted acid having a pKa value of below –10, a conjugate base of both a Brønsted acid and a Lewis acid and a conjugate base of a super strong acid.

2. The polymerization catalyst of claim 1, wherein [Y$^2$]$^-$ is selected from the group consisting of trifluoromethanesulfonic acid anion,
bis(trifluoromethanesulfonyl)methyl anion,
bis(trifluoromethanesulfonyl)benzyl anion,
bis(trifluoromethanesulfonyl)amide,
perchloric acid anion,
trifluoroacetic acid anion,
hexafluoroantimony anion,
fluorosulfonic acid anion,
chlorosulfonic acid anion,
fluorosulfonic acid anion/5-fluorinated antimony,
fluorosulfonic acid anion/5-fluorinated arsenic and
trifluoromethanesulfonic acid anion/5-fluorinated antimony.

3. The polymerization catalyst of claim 1, wherein each of [Y]$^-$ is a noncoordinating anion [Y$^1$]$^-$.

4. A polymerization catalyst according to claim 1, wherein at least one of the noncoordinating anions, [Y$^1$] which forms the polycation complex, is an anion wherein a plurality of groups are attached to boron.

5. A polymerization catalyst according to claim 1, which comprises, as catalyst components, the polycation complex (A) and an organoaluminum compound (B).

6. A polymerization catalyst according to claim 5, wherein at least one of the polycation complex (A) and said organoaluminum compound (B) is supported on a carrier.

7. A polymerization catalyst according to claim 1, which comprises, as catalyst components, the polycation complex (A) and Lewis acid (C).

8. A polymerization catalyst according to claim 7, wherein at least one of the polycation complex (A) and the Lewis acid (C) is supported on a carrier.

9. A polymerization catalyst according to claim 1, which comprises, as catalyst components, the polycation complex (A), the organoaluminum compound (B) and a Lewis acid (C).

10. A polymerization catalyst according to claim 9, wherein at least one of the polycation complex (A), the organoalumium compound (B) and the Lewis acid (C) is supported on a carrier.

11. The polymerization catalyst according to claim 1, wherein said polycation complex (A) comprises the reaction product of the following Compound (a), Compound (b), and Compound (c), wherein (a) is a transition metal compound of Group 4;

(b) is an ionic compound having an anion $[Y^1]^-$ that forms an ionic complex when reacted with transition metal Compound (a) at the anion $[Y^1]^-$ moiety; and (c) is an ionic compound having an anion $[Y^2]^-$ that forms an ionic complex when reacted with transition metal Compound (a) at the anion $[Y^2]^-$ moiety.

12. The polymerization catalyst of claim 1, wherein said polycation complex (A) comprises the reaction product of a Compound (d) and Compound (b'); wherein Compound (d) is of the formula $$[(CUHC)_n MX_m]^{j+}([Y^2]^-)_j$$

wherein M, CUHC, X, j, n, m and $[Y^2]^-$ are described as in claim 1; and (b') is an ionic compound having an anion $[Y^1]^-$ that forms an ionic complex when reacted with Compound (d) at the anion $[Y^1]^{31}$.

13. A process for producing a polymer, which comprises subjecting a monomer to homopolymerization or copolymerization in the presence of the polymerization catalyst of claim 1.

14. A process for producing a polymer, which comprises subjecting an olefin to homopolymerization or subjecting an olefin and other olefins or other monomers to copolymerization in the presence of the polymerization catalyst of claim 1.

* * * * *